(12) United States Patent
Kotula

(10) Patent No.: US 12,400,320 B1
(45) Date of Patent: Aug. 26, 2025

(54) METHOD AND SYSTEM FOR INSPECTING PACKAGES FOR PACKAGING DEFECTS

(71) Applicant: Sensors Incorporated, Delano, MN (US)

(72) Inventor: David J. Kotula, Maple Plain, MN (US)

(73) Assignee: Sensors Incorporated, Delano, MN (US)

( * ) Notice: Subject to any disclaimer, the term of this patent is extended or adjusted under 35 U.S.C. 154(b) by 0 days.

(21) Appl. No.: 18/737,739

(22) Filed: Jun. 7, 2024

(51) Int. Cl.
| | |
|---|---|
| *G01N 21/88* | (2006.01) |
| *B65G 69/00* | (2006.01) |
| *G06T 7/00* | (2017.01) |

(52) U.S. Cl.
CPC .............. *G06T 7/001* (2013.01); *B65G 69/00* (2013.01); *G01N 21/8851* (2013.01); *B65G 2203/0208* (2013.01); *B65G 2203/041* (2013.01); *G06T 2207/10028* (2013.01); *G06T 2207/30108* (2013.01)

(58) Field of Classification Search
CPC ........... G06T 7/001; G06T 2207/10028; G06T 2207/30108; B65G 69/00; B65G 2203/0208; B65G 2203/041; G01N 21/8851
See application file for complete search history.

(56) References Cited

U.S. PATENT DOCUMENTS

| | | | |
|---|---|---|---|
| 10,096,131 B2 * | 10/2018 | Driegen ................... | G06T 3/60 |
| 10,989,795 B2 | 4/2021 | Zweigle et al. | |
| 11,878,873 B2 * | 1/2024 | Simon .................. | G01B 11/245 |

FOREIGN PATENT DOCUMENTS

| | | |
|---|---|---|
| WO | WO/2018/189627 A1 | 10/2018 |
| WO | WO/2023/152374 A1 | 8/2023 |

OTHER PUBLICATIONS

Ding et al., "Stitching of depth and color images from multiple RGB-D sensors for extended field of view," International Journal of Advanced Robotic Systems (2019).
Fu et al., "Joint Texture and Geometry Optimization for RGB-D Reconstruction," CVF Conference on Computer Vision and Pattern Recognition (CVPR), pp. 5950-5959 (2020).
Alexiadis et al., "Real-Time, Full 3-D Reconstruction of Moving Foreground Objects From Multiple Consumer Depth Cameras," in IEEE Transactions on Multimedia, vol. 15, No. 2, pp. 339-358 (2013).

(Continued)

*Primary Examiner* — Gregory A Morse
*Assistant Examiner* — Renae A Bitor
(74) *Attorney, Agent, or Firm* — Gardella Alciati

(57) ABSTRACT

Systems and methods are disclosed for detecting package defects in packages transported on a conveyance. 3D imaging data is gathered for a 3D package having multiple nominally planar faces. The 3D imaging data is classified into different data groups associated with respective nominally planar faces and/or nominally straight edges of the 3D package. For each such face and/or edge, data associated with that face and/or edge is analyzed to create one or more consistency measures as compared to an expected appearance of that face or edge. The package is flagged as potentially defective when one or more of the consistency measures indicates a package defect.

23 Claims, 8 Drawing Sheets
(4 of 8 Drawing Sheet(s) Filed in Color)

(56) References Cited

OTHER PUBLICATIONS

Watson et al., "Full 3D Reconstruction From Multiple RGB-D Cameras" USF Tampa Graduate Theses and Dissertations. https://digitalcommons.usf.edu/etd/4607 (2013).
Cao et al., "Real-time High-accuracy Three-Dimensional Reconstruction with Consumer RGB-D Cameras," ACM Transactions on Graphics, vol. 37, No. 5, Article 171. (2018).
Penelle et al., "Geometrical 3D reconstruction using real-time RGB-D cameras." 2011 International Conference on 3D Imaging (IC3D), Liege, Belgium, pp. 1-8 (2018).

* cited by examiner

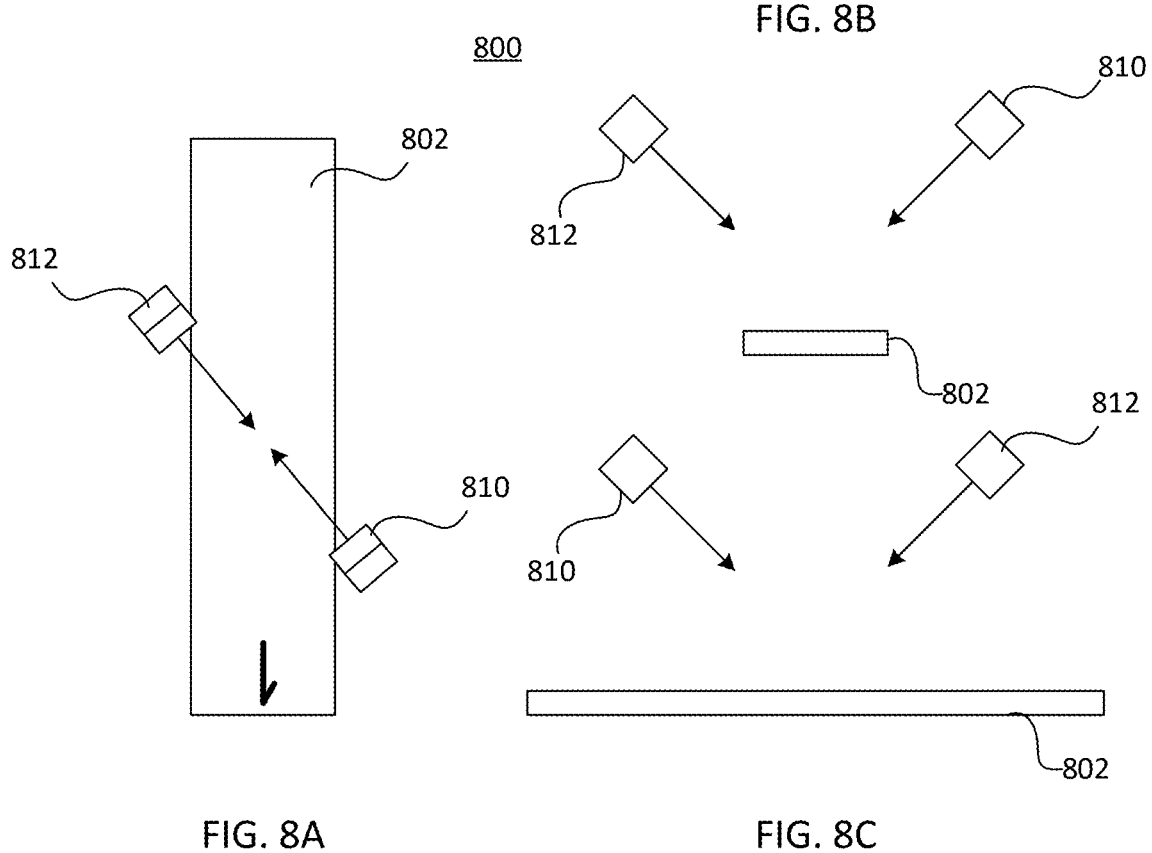

METHOD AND SYSTEM FOR INSPECTING PACKAGES FOR PACKAGING DEFECTS

BACKGROUND

Many products are packaged for sale in plastic, cardboard, paperboard, and cartonboard boxing material. Various defects in boxing may appear during packaging, handling, and distribution. Some defects may indicate potential damage to the package contents or spoilage of contents due to package breaches, and some may render the product unsalable for aesthetic reasons or due to the potential that the contents have been tampered with. It is desirable to identify damaged packaging prior to palletization, packing into larger boxes for distribution, etc., to reduce the number of items rejected further down the distribution chain, resulting in waste, return costs, return credits, etc.

SUMMARY OF ILLUSTRATIVE EMBODIMENTS

Packaged products are inspected for packaging defects, according to methods and systems described herein, using a three-dimensional (3D) imaging system. In many embodiments, the 3D imaging system is placed around a conveyance such as a belt conveyor, roller conveyor, skatewheel conveyor, or chain conveyor, and inspects packages as they move along the conveyance. Other embodiments, for instance deployed in fulfillment and distribution centers, may have palletizing/depalletizing and/or bin replenishment/picking robotic systems that handle/convey packages and can be programmed or enhanced to perform packaging defect inspection while otherwise handling packages.

In one aspect, the present disclosure relates to a method for detecting package defects during conveyance. The method is adapted to gather 3D image data for a 3D package having multiple nominally planar faces, while the package lies within or traverses a conveying volume (in some embodiments, the conveying volume is partially formed by the movement of the package along the conveyance over time). The 3D image data is gathered from at least two different viewpoints external to the conveying volume and looking into the conveying volume. Although many different arrangements of the viewpoints are possible, in order to gather data on five sides of a six-sided box, viewpoints must be arranged to the left and right of, and above, the conveying volume. Generally, two viewpoints can satisfy this condition for most arbitrary box orientations, but three viewpoints can ensure that all arbitrary box orientations have five visible sides. More viewpoints may also be used, if required for a given set of implementation constraints.

The 3D image data gathered for a given package is classified into corresponding data groups respectively associated with nominally planar faces of the 3D package. At least some 3D image data associated with each visible face is analyzed to compute one or more consistency measures, as compared to an expected appearance of that face. For instance, the system may solve for a plane that best describes the face, and then detect and characterize portions of the face that lie outside of a tolerance band as potential open, lifted, or torn flaps, etc. The edges of the 3D package can also be defined based on where two planar faces meet, and imaging data along these edges can be analyzed for consistency with a straight line (with a defect such as a crushed corner indicated by the partial lack of such line).

Where one or more of the consistency measures indicates a package defect, the package can be flagged.

In another aspect, a system is disclosed for practicing methods such as described above. The system comprises multiple 3D cameras, which can be staring laser line profilers in configurations where packages translate past a projected laser line. The cameras may also be volume scanning 3D cameras (i.e., snapshot cameras that gather depth data at multiple x and y angular deflections). Preferably, the system is calibrated with the relative spatial locations and staring angles of the 3D cameras, which is particularly beneficial in embodiments where the data from multiple cameras is merged. The system may also comprise a coordinate transformation module, with particularly useful coordinate systems being those that place nominal package edges perpendicular to at least one axis of the coordinate system. A classifier, consistency measurement module, and defect decision module process the data, e.g., as described above.

The foregoing general description of the illustrative implementations and the following detailed description thereof are merely exemplary aspects of the teachings of this disclosure and are not restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of the specification, illustrate one or more embodiments and, together with the description, explain these embodiments. The accompanying drawings have not necessarily been drawn to scale.

Figure 1:
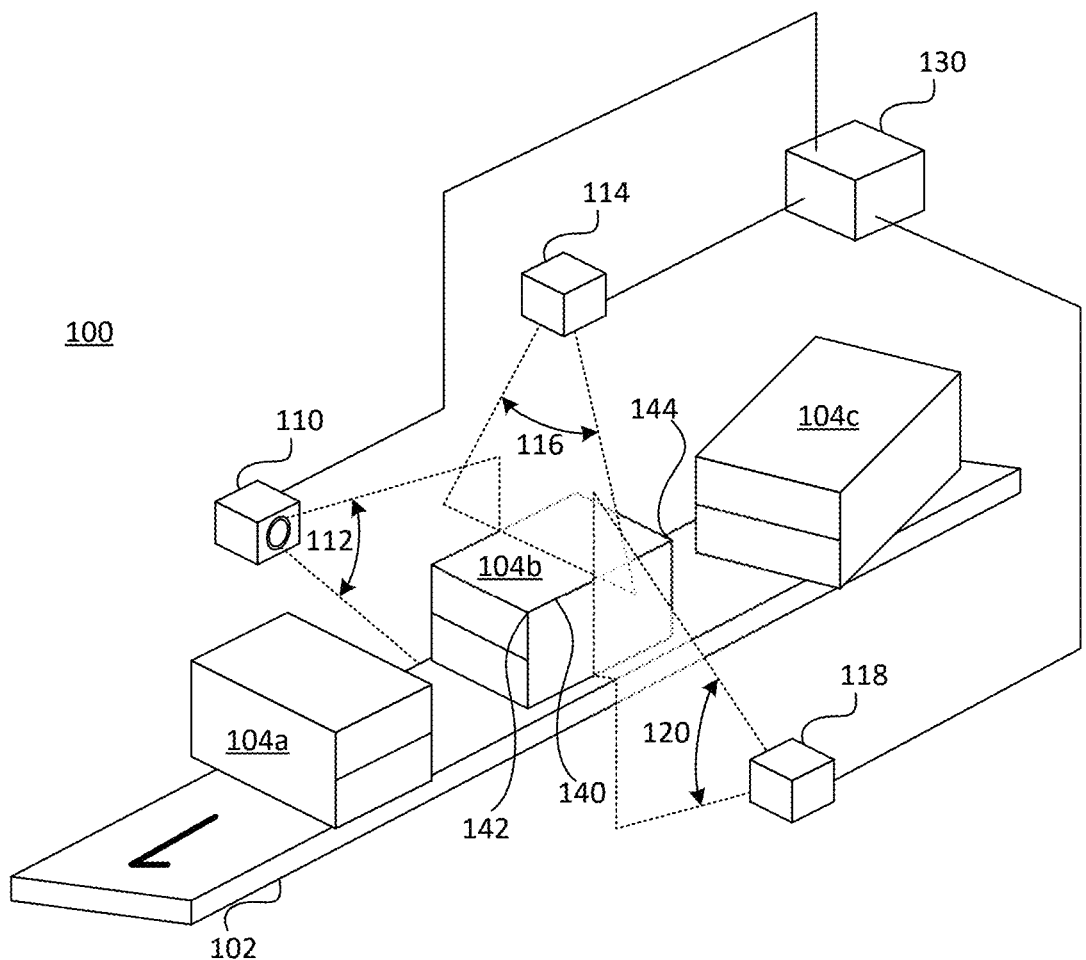
Figure 2A:
Figure 2B:
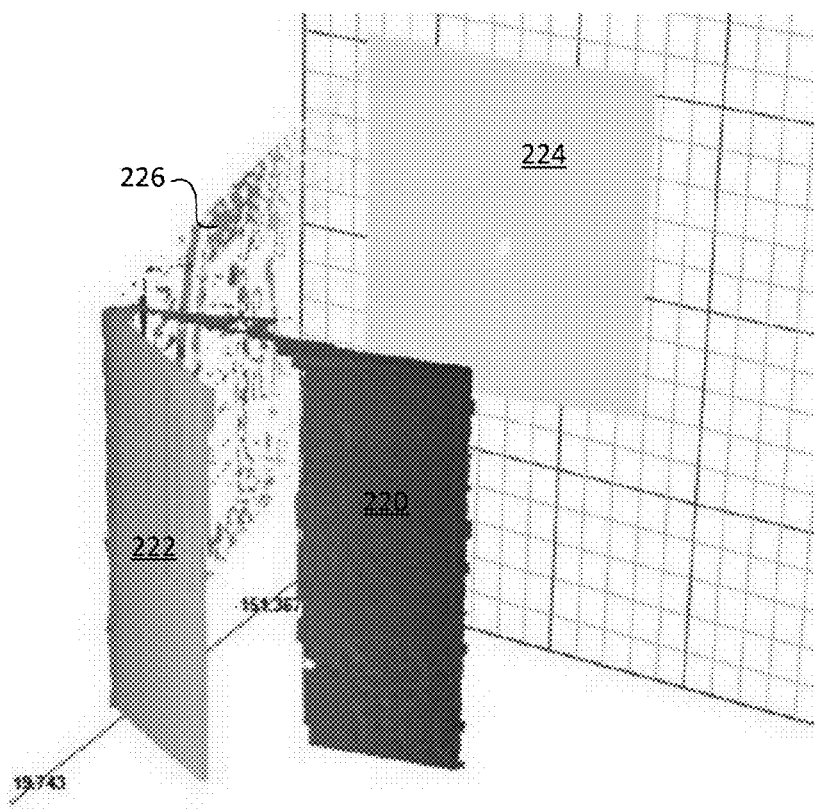
Figure 3A:
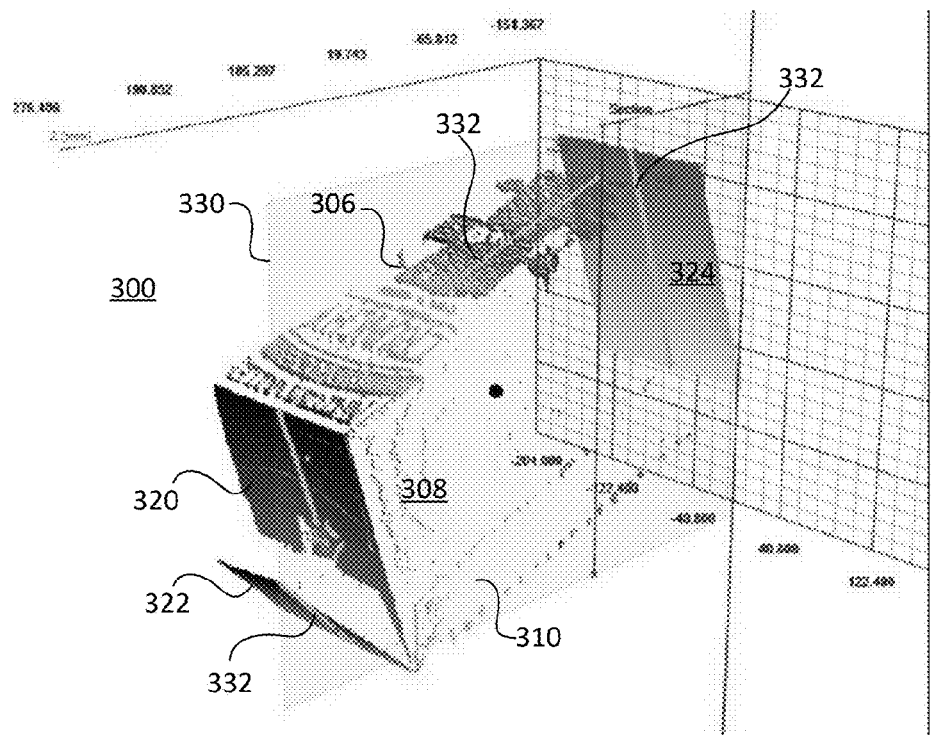
Figure 3B:
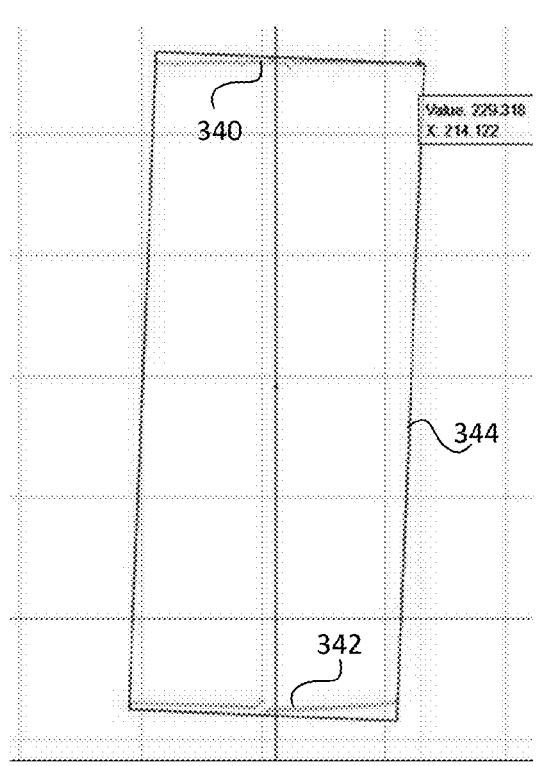
Figure 3C:
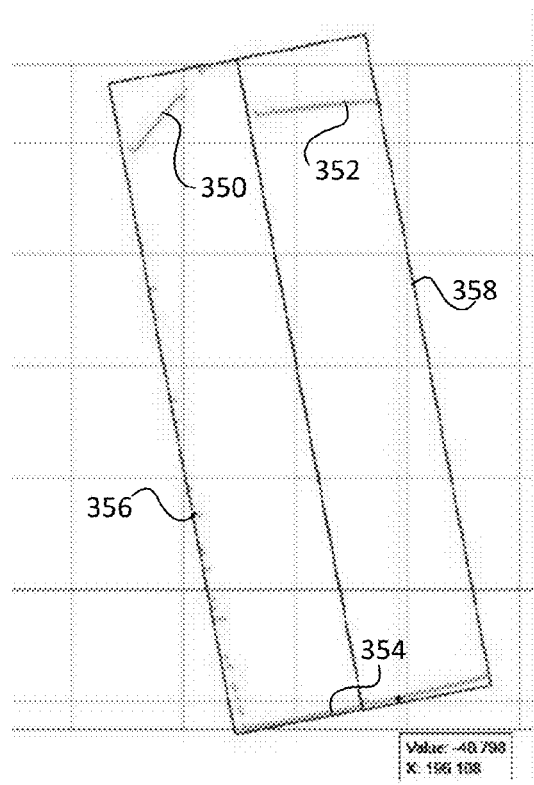
Figure 4A:
Figure 4B:
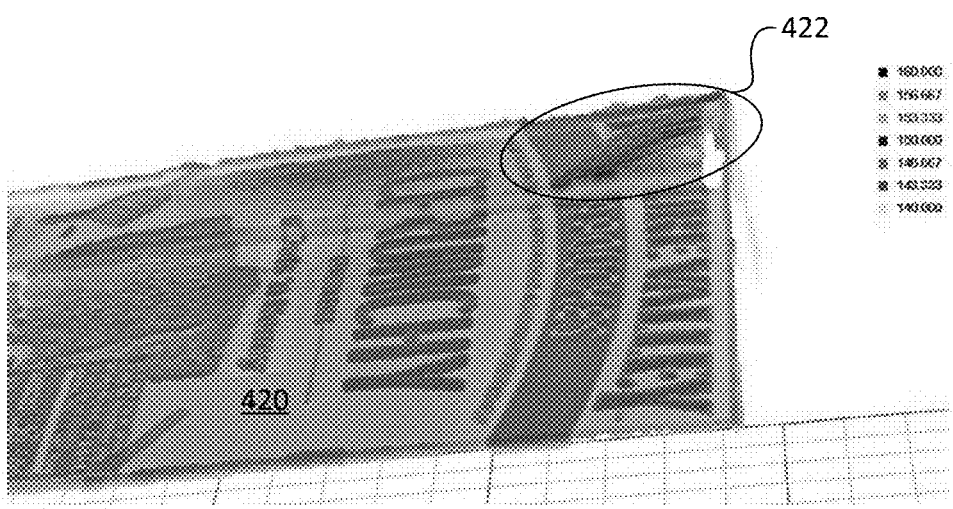
Figure 5:
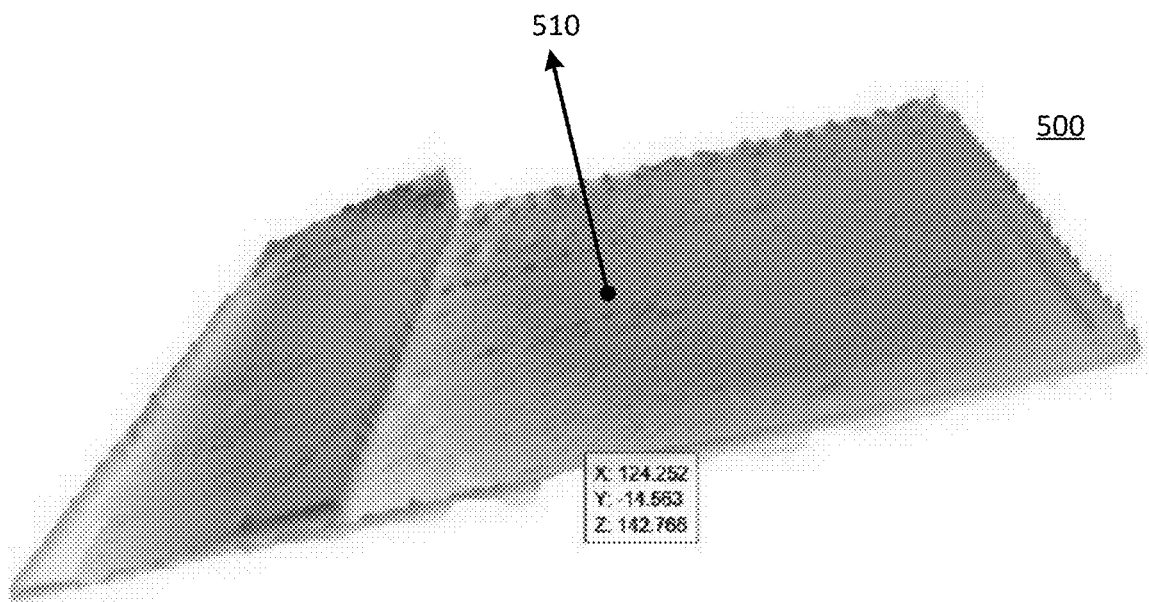
Figure 6:
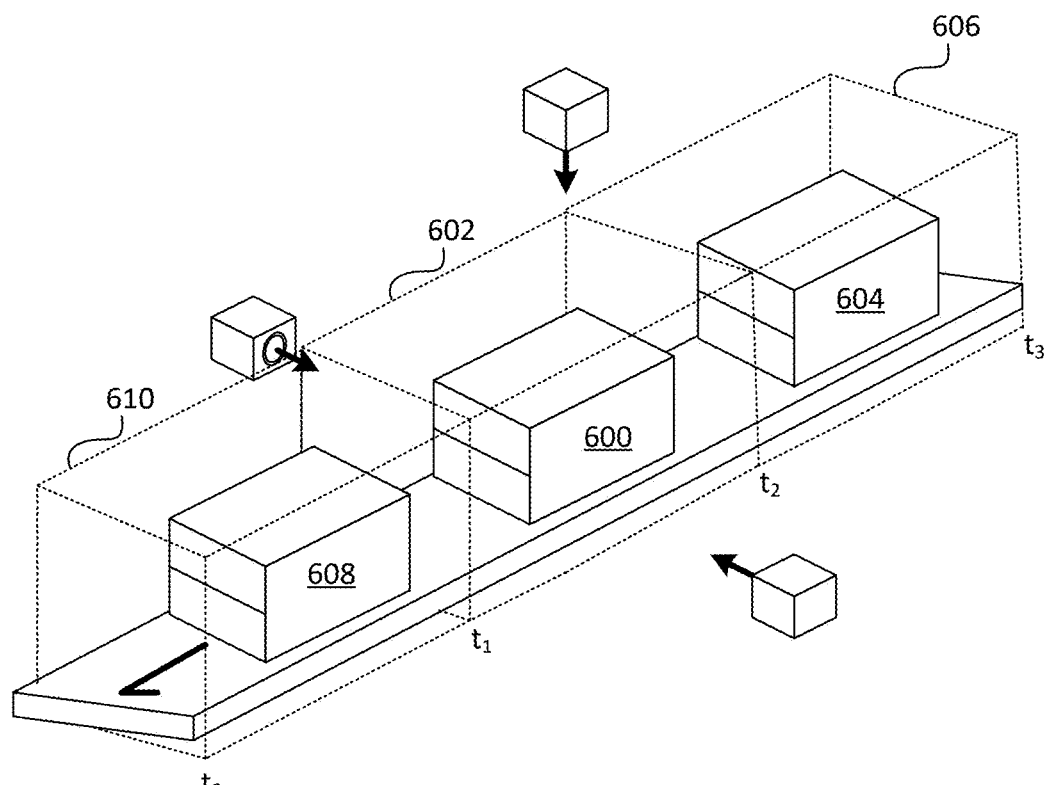
Figures 7A, 7B, 7C:
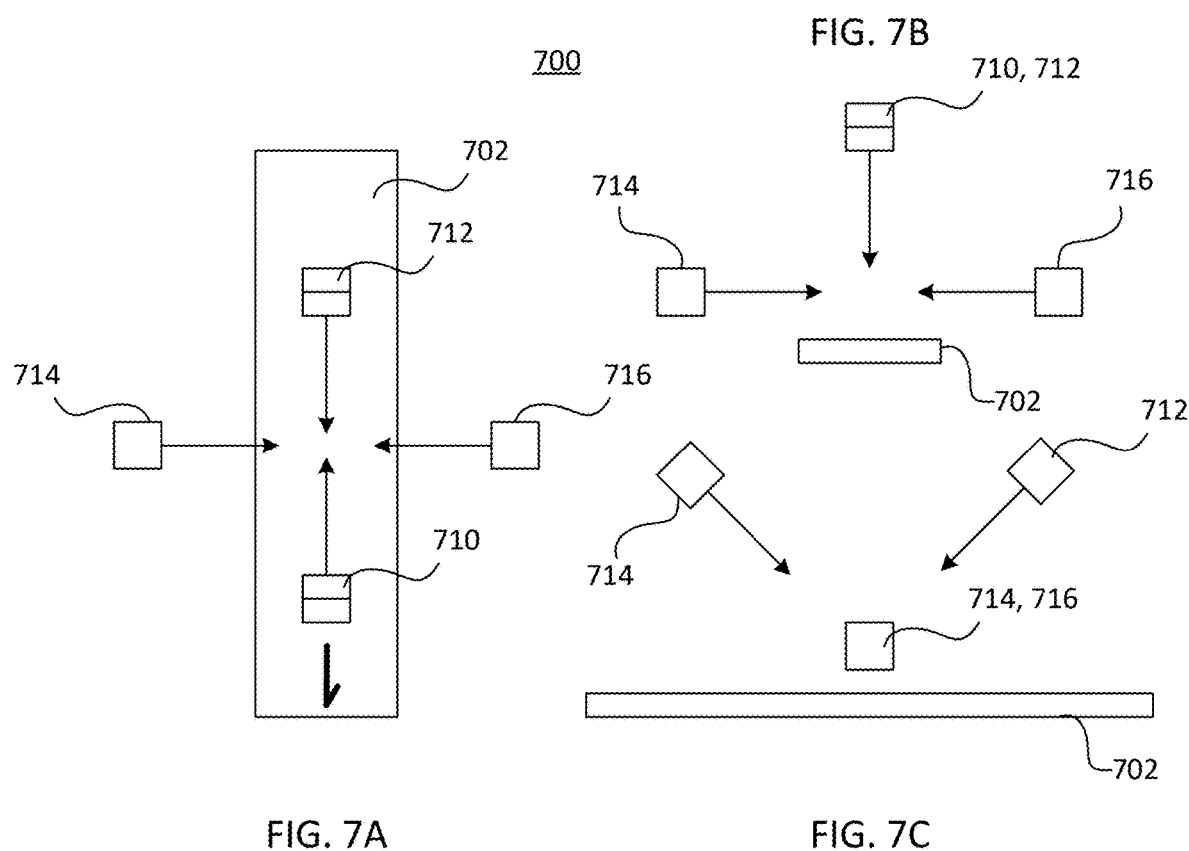
Figures 9A, 9C:
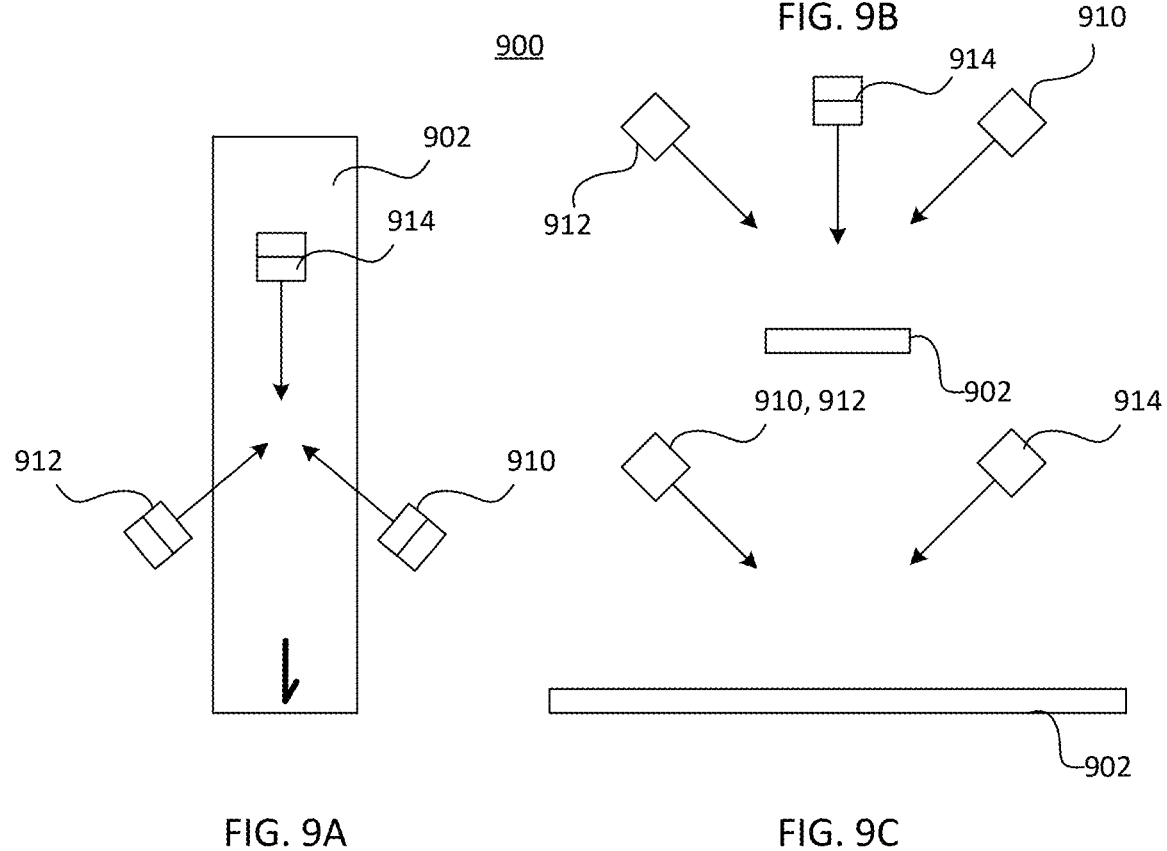

Any values or dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 1 illustrates a configuration of a 3D package inspection system according to an embodiment, for use with a conveyance that translates packages past a scanning station;

FIGS. 2A and 2B show, respectively, a package with an open flap on a conveyor and a 3D image output for the package;

FIGS. 3A-3C show, respectively, a section through a 3D image of a package, and a 2D plot of such a section from an acceptable package and from a package with an open flap;

FIGS. 4A and 4B show, respectively, a package with a lifted corner of a flap on a conveyor and a 3D image output for the package top surface plotted against a planar model;

FIG. 5 illustrates a map of deviations in a planar surface from the average of the surface;

FIG. 6 illustrates the concept of a conveying volume for laser line profilers and a moving conveyor;

FIGS. 7A-7C show orthographic views of a four-camera arrangement according to an embodiment;

FIGS. 8A-8C show orthographic views of a three-camera arrangement according to an alternate to the FIG. 1 embodiment; and FIGS. 9A-9C show orthographic views of a two-camera arrangement according to an embodiment.

DETAILED DESCRIPTION OF ILLUSTRATIVE EMBODIMENTS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

As demonstrated in FIG. 1, an embodiment system 100 can be arranged about a conveyance 102 along which packages 104a, 104b, 104c move. The packages may all be of a standard shape and size, or may be of varying shapes/sizes. The packages may all be in a fixed orientation as they pass the imaging cameras, or somewhat constrained, or unconstrained. The fixed orientation may or may not always present the package "top" on top, package "front" facing a certain direction, etc., or not. Finally, inspection of the side of the package resting on the conveyance will generally not be possible, unless at some point the package orientation is changed to allow so. Depending on which of these various constraints exist in a system, different camera orientations may be desirable, and it may be possible where physical constraints exist to make assumptions that simplify processing.

System 100 comprises three 3D cameras 110, 114, 118, each outputting image data to a processor system 130. The system may comprise a frame and/or mounts to hold the components (not shown), or they may be mounted opportunistically within a production environment. In one embodiment, each of cameras 110, 114, 118 are LMI Gocator 2380 3D laser line profilers, available from LMI Technologies Inc. of Vancouver, BC, Canada. These laser line profilers gather 1280 linear data points per scan line, at a spacing of 0.375 mm at a near field of view of 35 cm, and have a z (depth) resolution of 0.092 mm, from 35 cm to 115 cm working distance. In one configuration according to FIG. 1, the three cameras were located so as to gather coplanar depth information, with camera 114 located 66 cm above a conveyance surface and projecting a laser line straight down in a scan line 116, and cameras 110 and 118 separated across the conveyance surface by 113.5 cm, each located 15.5 cm above the conveyance surface and centered so as to stare horizontally across the area above the conveyance and project respective scan lines 112, 120. Alternate configurations replace one or more of the laser line profilers with a 3D point cloud area imager, such as a 3D-A5000 series 3D camera available from Cognex Corporation of Natick, MA. In other embodiments, one or more time-of-flight imagers can be included in the imager constellation.

The processor system 130 connects to each camera via a wired or wireless connection, and runs processes to communicate with each camera and ingest raw or pre-processed 3D image data from each camera. The processes may include software and/or Application Programming Interfaces (APIs) supplied by the camera manufacturer. The ingested 3D data is further processed within processor system 130, as will be described below, using one or more microprocessors, graphics processing units (GPUs), field-programmable gate arrays (FPGAs), tensor processing units (TPUs), or other forms of processors programmed and/or hardware-configured to detect package defects. In some systems, each camera may include an integrated processor capable of performing some image processing operations that would otherwise be performed by processor system 130—such integrated processors may be considered part of the processor system 130.

The processor system 130 can provide various forms of output (not shown) to signal to a machine or human operator that a package defect has been detected on a particular package. The signal can be used, e.g., to divert or remove the signaled package from a production line for different handling and/or inspection.

In some embodiments, the cameras 110, 114, 118 may be "free running," and the processor system 130 examines data streams from one or more of the cameras to determine when a new box has entered/exited the scanning station. For instance, top camera 114 will return data with no points "higher" than the top surface of the conveyance when empty regions of the conveyance are traversing the conveying volume. A conveying volume containing a package can be recognized between a first top camera image line that contains a point higher than the top surface of the conveyance and a following top camera image line that contains no point higher than the top surface. Similar package triggers can be initiated based on side cameras 110, 118 by examining portions of image lines 112 and/or 120 above the conveyance for return signals in the conveyance region. In some camera arrangements, with arbitrarily positioned packages, it may be required that data from all cameras is monitored, e.g., as different cameras could be first/last to detect a particular package moving into the conveying volume.

For each new package detected, processor system 130 performs one or more classification operations, and calculates one or more consistency measures. For these operations, data from each camera can be examined separately, or data from two or more cameras can be merged prior to classification and measure calculation.

Generally, prior to merging data, processor system 130 performs a calibration operation in order to understand and compensate for the different reference coordinate systems of the cameras. In one embodiment, the calibration operation comprises running a uniform package through the conveyance volume, and then calculating a set of transforms that cause the edges and corners of the uniform package to image to a common position. For instance, an overhead camera and a right camera each image a right-top edge 140 of box 104b, between a front corner 142 and rear corner 144. Calibrating cameras 114 and 118 can include recognizing the "top" edge 140 from camera 118 and the "right" edge 140 from camera 114, and calculating a transform for each edge description that maps them to the same position in a common reference frame. Similar calibrations for other camera pairs allow three, four, and larger viewpoint clusters to be jointly calibrated. Calibration can be assisted by a camera constellation definition that roughly identifies the location of each viewpoint in 3D space. Recalibration operations can be initiated as frequently as on every package, after a given number of package scans, after a given amount of run time, only on manual command, or some other criterion.

The common reference frame is a design choice. For packages that are regular, e.g., a cuboid, a preferred reference frame, however, is one that defines a "z" direction perpendicular to the top surface of the conveyance, an "x" direction along the direction of movement of the conveyance, and a "y" direction perpendicular to both the "x" and "z" directions. A (0,0,0) coordinate point in this reference frame can be defined anywhere that is convenient, such as (point package is first detected, left-right center of conveyance, top surface of conveyance).

The following description assumes a merging of multi-camera data into a common reference frame, but those skilled in the art recognize that various described image data operations can be performed on separate camera data, with resulting descriptions (planes, edges, corners, etc., or consistency measures) instead of camera data merged, or used separately in some cases, to make package defect decisions.

FIG. 2A shows a conveyance 202 supporting a package 204, and FIG. 2B shows corresponding 3D sensor data merged from two 3D imagers located to the left and to the right of conveyance 202. The package 204 is intended to be a cuboid shape, but has an open flap defect. Front side 206 is a flat plane. Top side 208 is a nominally flat plane that includes a sealed flap 210 (which overlays a portion of the top side 208 and is thus in a raised plane the thickness of the cartonboard above the rest of the top). A left end of the box includes a closed flap 220 and an open flap 222. A right end of the box 224 is not visible in the standard image of FIG. 2A, but is shown in the 3D data of FIG. 2B and is planar. A rear side of the box 226 is not visible in the standard image of FIG. 2A, but is sparsely imaged in the 3D data of FIG. 2B and is planar.

In one embodiment, the data shown in FIG. 2B is used to estimate the positions and orientations of three vertical surfaces corresponding respectively to the left and right ends and rear side of package 204. A vertical surface is generally indicated by the presence of lines of image data with identical (within the resolution of the system) x and y coordinates but different z coordinates, where adjacent such lines step in x and/or y at a constant rate. Systems according to various embodiments use different strategies to discover the size and position of a cuboid package.

One estimation strategy is illustrated in FIGS. 3A-3C. FIG. 3A shows a 3D projection 300 of the defective package 204 of FIG. 2A, where what was the "top" now appears on the front as a plane 308 and an overlying planar flap 310, a side 306 is on top, and a right end 324 and a left end consisting of a closed section 320 and an open flap 322 are visible. A section 330 is taken through roughly the middle of the data, parallel to the conveyance surface and roughly halfway to the package top surface 308, which extracts slice data 332 lying along the intersection of 3D projection 300 and section 330. Various estimation techniques known to those skilled in the art, such as least squares estimation, Hough transforms, etc., can be used to aid in obtaining basic information about the shape and size of the package from slice data 332.

FIG. 3B illustrates data processing results based on slice data for a nominally cuboid package, while FIG. 3C illustrates data processing results for slice data 332 indicating a defective package. A Hough transform, for example, can be applied to slice data to find a minimum bounding box position and orientation. In FIG. 3B, the front and back of the package are not imaged due to the orientation of the left and right cameras, and thus the slice data consists of left-end data 340 and right-end data 342. Based on the left- and right-end data, the system solves for a minimum bounding box 344 with good accuracy. In FIG. 3C, one long side of the package is sparsely imaged, thus the slice data consists of left-end open-flap data 350, left-end closed-flap data 352, right-end data 354, and side data 356. The system solves for a minimum bounding box 358 that is accurate in position and orientation, but the bounding box 358 is elongated compared to box 344 of FIG. 3B, due to the open flap. It is also apparent from a comparison of FIGS. 3B and 3C that very little of data 352 and 350 lies near a bounding box side, whereas data 340 lies quite near a bounding box side. This is an indication of a potential package defect.

The bounding box is used in one embodiment to classify 3D imaging data according to respective nominally planar faces of the 3D package. For instance, data 356 can easily be classified as belonging to side 306 of FIG. 3A where it lies to the left of the long axis of the bounding box and some threshold distance from either end of the bounding box. Likewise, data 354 can easily be classified as belonging to end 324 of FIG. 3A where it lies in the bottom quartile (or some other threshold distance) of the bounding box and some threshold distance from either side of the bounding box. A similar rule can classify most of data 350 and 352 as left-end data even though that end of the package is defective.

Once initial classification is complete, data from one or more other slices through the package can be similarly classified using the same bounding box. Alternately, multiple bounding boxes can be calculated independently for multiple slices, or the single bounding box may be calculated using multiple slices or even all data from one or more imagers.

Once a sufficient amount of data has been classified, a planar fit is calculated for each data group. The planar fit can alternately be based on the respective side/end of the bounding box. Preferably, based on the planar fit, edges of the package are estimated based on the intersection of adjacent planar side metrics.

Some or all data classified to each given face of the package is compared to the planar fit for that face to form a consistency measure. For instance, an absolute average deviation between the data and the planar fit can be compared to an expected average absolute deviation, based on past packages inspected and the angle of that given side to the conveyance (as error may be expected to be larger for glancing angles). A threshold multiple (for instance 1.5×) the expected absolute deviation can be used to flag packages where one or more ends/sides exceeds the expected absolute deviation. The threshold multiple may be set empirically to allow an acceptable amount of package non-uniformity.

In some instances, a lesser package defect could potentially pass a global consistency measure test for a side. For instance, FIG. 4A illustrates a package 400 having one corner 402 of a long flap lifted. Because this corner is a small area of the side imaged, it may or may not trigger a variance from an expected absolute deviation of the side imaged. As shown in the 3D imaging data 420 of FIG. 4B, however, the data in a region 422 clearly deviates significantly from planarity. This may be handled in at least two ways. First, when an absolute average deviation is above a smaller threshold from expected, different absolute average deviations can be computed for smaller areas of the suspect surface. If most such areas clearly pass the consistency measure, but one or more others fail significantly, a package defect may be flagged despite the overall side of the package being within tolerance.

A second method for potentially finding localized defects is to calculate consistency metrics for edges of the package. In one embodiment, pixels that lie along the common ends of two adjacent sides are classified as edge pixels. The edge pixels are tested for linearity, and when a significant deviation from linearity is detected, this can indicate a lifted corner, dented or torn package edge, etc.

When calculating an average absolute deviation for a plane, the deviation is preferably calculated orthogonal to the planar fit. For instance, in FIG. 5, a deviation map 500 is illustrated for a box side with a lifted flap, with the deviation taken in the direction 510. The lifted flap skews the planar estimate such that the right end of the data is "too high" compared to the planar estimate and the left end of the data is "too low" compared to the planar estimate, except for the lifted area of the flap, which is also "too high." This figure illustrated that even though a defective portion of a surface may skew an estimate in the plane describing that surface, the incorrect estimate will itself cause an overall increase in the calculated average absolute deviation.

FIG. 6 depicts the concept of a conveying volume, as applied to 3D laser line profilers and a moving conveyance. In FIG. 6, a package 600 lies completely within a conveying volume 602. The conveying volume 602 has a top and sides set either by physical measurement limits of the 3D laser line profilers or maximum possible package dimensions (where different). As for the front and rear of the conveying volume, these are set based on a "start time" $t_1$ and a "stop time" $t_2$, where all data between those times is assigned to the volume for package 600. Similarly, a following package 604 is within a conveying volume 606 between times $t_2$ and $t_3$, and a leading package 608 is within a conveying volume 610 between times to and $t_1$. The successive conveying volumes may be adjacent, as shown in FIG. 6, which, for instance, can be based on the start of a new conveying volume as soon as the last preceding box passes beyond the imagers' view. There may also be gaps between the conveying volumes, e.g., a new conveying volume does not begin until some data above the level of the conveyance is detected. It should also be noted that the same conveying volume may require gathering data from different imagers over staggered time intervals. This is possible if the scan lines of the different imagers are not coplanar, as is the case for several alternate configurations to be discussed next.

FIGS. 7A-7C show, respectively, a plan view, front elevation, and right-side elevation of an alternate 3D camera configuration 700. In configuration 700, instead of a single overhead imager as in FIG. 1, a first overhead imager 712 is placed above conveyance 702, staring down and forward (in the direction of conveyance travel). A second overhead imager 710 is placed above conveyance 702, staring down and backward. As in the FIG. 1 configuration, two additional imagers 714, 716 are placed to the left and right of the conveyance and staring directly across it. It can be appreciated that configuration 700 provides better 3D imaging data collection than FIG. 1 of the front and back of a package when the package is substantially square to the conveyance.

FIGS. 8A-8C show, respectively, a plan view, front elevation, and right-side elevation of another alternate 3D camera configuration 800. In configuration 800, instead of a single overhead imager and two side imagers as in FIG. 1, first and second overhead imagers 810, 812 collect both the overhead and the left, right imaging data. Imager 812 is placed above conveyance 802 and to its left, staring down and forward (in the direction of conveyance travel) and right across the conveyance at a 45-degree angle. Imager 810 is placed above conveyance 802 and to its right, staring down and backward and left across the conveyance at a 45-degree angle. It can be appreciated that configuration 800 provides 3D imaging data collection that covers the five visible sides of a package unless the package is also oriented at a 45-degree angle, in which case two sides will have little to no data.

FIGS. 9A-9C show, respectively, a plan view, front elevation, and right-side elevation of another alternate 3D camera configuration 900. In configuration 900, instead of a single overhead imager and two side imagers as in FIG. 1, three overhead imagers 910, 912, 914 collect overhead and left, right imaging data. Imager 912 is placed above conveyance 902 and to its left, staring down and backward (opposite the direction of conveyance travel) and right across the conveyance at a 30-degree angle. Imager 910 is placed above conveyance 902 and to its right, staring down and backward and left across the conveyance at a 30-degree angle. Imager 914 is placed above conveyance 902, staring down and forward. It can be appreciated that configuration 900 provides 3D imaging data collection that covers the five visible sides of a package in any orientation.

From the preceding examples, those skilled in the art will appreciate that many variations on imager constellation may be selected for a particular application. For instance, in FIG. 7A, imagers 710 and 712 could be mounted at a common location (or even be the same imager, with the ability to switch/swivel between forward and rearward staring angles). In such case, larger time offsets between matching data from different viewing angles will be present, but is not an obstacle to merging data unless there is a risk of a package changing orientation before all data is gathered.

3D imagers may also be used that capture data across an extended field of view in both x and y directions, e.g., volume/point cloud 3Dimagers. Such imagers can be operated so as to take several (x, y, z) images of a package passing their position, when they are, e.g., ahead of, aligned with, and behind a passing package, such that two such imagers above and to the left and right of a conveyance gather data from all five visible sides of a package in any orientation. Such imagers could also be placed on a conveyance such as a robotic palletization or pick and place system and scan for package defects at the time a package is being handled by the robotic system.

A given embodiment may also be configured to handle conditions particular to a given application. For instance, some packages may have flaps that, when properly closed, leave a gap between them on a surface of the package. An embodiment can be programmed to ignore missing/stepped inward data at the expected position of a gap when determining whether a surface is consistent with expected data. This embodiment may, for instance, use bounding box dimensions to classify the actual front, back, top, etc., sides of a package of known dimensions as such and then compare them to templates that account for expected variations from a simple planar surface. A given embodiment may handle package shapes other than cuboids, e.g., a milk carton for which a more complex set of planes describe the nominal shape of a package.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventor intended that that feature or function may be deployed, utilized or implemented in connection with the alternative embodiment unless the feature or function is incompatible with the alternative embodiment.

Reference has been made to illustrations representing methods and systems according to implementations of this disclosure. Aspects thereof may be implemented by computer program instructions. These computer program instructions may be provided to a processor of a general-purpose computer, special purpose computer, or other programmable data processing apparatus and/or distributed processing systems having processing circuitry, such that the instructions, which execute via the processor of the computer or other programmable data processing apparatus, create means for implementing the functions/operations specified in the illustrations.

One or more processors can be utilized to implement various functions and/or algorithms described herein. Additionally, any functions and/or algorithms described herein can be performed upon one or more virtual processors. The virtual processors, for example, may be part of one or more physical computing systems such as a computer farm or a cloud drive.

Aspects of the present disclosure may be implemented by software logic, including machine readable instructions or commands for execution via processing circuitry. The software logic may also be referred to, in some examples, as machine readable code, software code, or programming instructions. The software logic, in certain embodiments, may be coded in runtime-executable commands and/or compiled as a machine-executable program or file. The software logic may be programmed in and/or compiled into a variety of coding languages or formats.

Aspects of the present disclosure may be implemented by hardware logic (where hardware logic naturally also includes any necessary signal wiring, memory elements and such), with such hardware logic able to operate without active software involvement beyond initial system configuration and any subsequent system reconfigurations (e.g., for different object schema dimensions). The hardware logic may be synthesized on a reprogrammable computing chip such as a field programmable gate array (FPGA) or other reconfigurable logic device. In addition, the hardware logic may be hard coded onto a custom microchip, such as an application-specific integrated circuit (ASIC). In other embodiments, software, stored as instructions to a non-transitory computer-readable medium such as a memory device, on-chip integrated memory unit, or other non-transitory computer-readable storage, may be used to perform at least portions of the herein described functionality.

Various aspects of the embodiments disclosed herein are performed on one or more computing devices, such as a laptop computer, tablet computer, mobile phone or other handheld computing device, or one or more servers. Such computing devices include processing circuitry embodied in one or more processors or logic chips, such as a central processing unit (CPU), graphics processing unit (GPU), field programmable gate array (FPGA), application-specific integrated circuit (ASIC), or programmable logic device (PLD). Further, the processing circuitry may be implemented as multiple processors cooperatively working in concert (e.g., in parallel) to perform the instructions of the inventive processes described above.

The process data and instructions used to perform various methods and algorithms derived herein may be stored in non-transitory (i.e., non-volatile) computer-readable medium or memory. The claimed advancements are not limited by the form of the computer-readable media on which the instructions of the inventive processes are stored. For example, the instructions may be stored on CDs, DVDs, in FLASH memory, RAM, ROM, PROM, EPROM, EEPROM, hard disk or any other information processing device with which the computing device communicates, such as a server or computer.

These computer program instructions can direct a computing device or other programmable data processing apparatus to function in a particular manner, such that the instructions stored in the computer-readable medium produce an article of manufacture including instruction means which implement the function/operation specified in the illustrated process flows.

The computing device, in some embodiments, further includes a display controller for interfacing with a display, such as a built-in display or LCD monitor. A general purpose I/O interface of the computing device may interface with a keyboard, a hand-manipulated movement tracked I/O device (e.g., mouse, virtual reality glove, trackball, joystick, etc.), and/or touch screen panel or touch pad on or separate from the display.

Moreover, the present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry or based on the requirements of the intended back-up load to be powered.

The functions and features described herein may also be executed by various distributed components of a system. For example, one or more processors may execute these system functions, where the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a wired or wireless LAN or WAN, or may be a public network, such as the Internet. Input to the system, in some examples, may be received via direct user input and/or received remotely either in real-time or as a batch process.

Although provided for context, in other implementations, methods and logic flows described herein may be performed on modules or hardware not identical to those described. Accordingly, other implementations are within the scope that may be claimed.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A method for detecting package defects in packages transported on a conveyance, the method comprising:
   gathering three-dimensional (3D) imaging data for a 3D package having multiple nominally planar faces, while the package lies within a conveying volume, the 3D imaging data gathered from at least two different viewpoints external to the conveying volume and looking into the conveying volume,
       at least one of the different viewpoints to the left of the conveying volume,
       at least one of the different viewpoints to the right of the conveying volume, and
       at least one of the different viewpoints above the conveying volume;
   locating edges of the package, using the leftmost data and the rightmost data of the 3D imaging data,
   translating the 3D imaging data to at least one common reference frame,
       wherein the at least one common reference frame comprises a first reference frame with an axis perpendicular to a top surface of the conveyance, and another axis parallel to the direction of motion of the conveyance,
   classifying at least a portion of the 3D imaging data into corresponding data groups, each data group of the multiple data groups associated with a respective nominally planar face of the 3D package; and
   for each face of the respective nominally planar faces of the 3D package associated with at least one data group with 3D imaging data classified to that group,
       analyzing at least some 3D imaging data associated with that face to create one or more consistency measures as compared to an expected appearance of that face, and
       flagging the package when at least one of the one or more consistency measures indicates a package defect.

2. The method of claim 1, further comprising determining, from at least a portion of the 3D imaging data, an orientation of the 3D package on the conveyance.

3. The method of claim 1, wherein
   at least one of the different viewpoints is located ahead of a rearmost extent of the conveying volume, as determined with respect to a direction of motion of a conveyance supporting the package, and
   at least one of the different viewpoints is located behind a frontmost extent of the conveying volume, as determined with respect to the direction of motion of the conveyance supporting the package.

4. The method of claim 1, further comprising merging 3D imaging data, gathered from at least two of the at least two different viewpoints, either prior to or subsequent to classifying.

5. The method of claim 1, further comprising, for at least one face of the nominally planar faces of the 3D package:
   determining that a given viewpoint of the different viewpoints has resulted in higher quality 3D imaging data of that face than the 3D imaging data gathered from others of the different viewpoints; and
   based on the determining, selecting 3D imaging data gathered from the given viewpoint to calculate the one or more consistency measures.

6. The method of claim 1, wherein the package defect is an open package flap.

7. The method of claim 1, wherein the package defect is a dented package.

8. The method of claim 1, wherein at least one of the nominally planar faces comprises a gap or seam, and wherein analyzing at least some 3D imaging data associated with that face to calculate one or more consistency measures comprises accounting for an expected location of the gap or seam.

9. The method of claim 1, further comprising rejecting 3D imaging data indicative of imaging the conveyance.

10. The method of claim 1, wherein the at least two different viewpoints are respectively associated with respective fixed viewpoint 3D cameras.

11. The method of claim 10, wherein the at least two different viewpoints comprise three viewpoints.

12. The method of claim 10, wherein at least one of the 3D cameras is a 3D laser line profiler.

13. The method of claim 10, wherein at least one of the 3D cameras is a volume scanning camera.

14. The method of claim 1, wherein at least two of the different viewpoints comprise a same camera location that views two different positions along the conveyance.

15. The method of claim 1, wherein the conveyance is in motion during gathering the 3D imaging data.

16. The method of claim 1, further comprising using topmost data subsequent to translating to locate an upper surface of the package.

17. The method of claim 1, wherein the at least one common reference frame comprises a reference frame with an axis parallel to a direction of motion of the conveyance.

18. The method of claim 1, wherein analyzing at least some 3D imaging data associated with a face of the nominally planar faces to create one or more consistency measures comprises estimating a surface location for the face, and marking potential defects for positions on the face that lie outside of a tolerance band for that surface location.

19. The method of claim 1, further comprising estimating a location of an edge of the 3D package from the intersection of 3D imaging data associated with adjacent faces of the nominally planar faces, analyzing 3D imaging data along that intersection for a match to a nominally straight line, and flagging the package when the 3D imaging data along that intersection lies outside of a tolerance band for a straight line.

20. The method of claim 1, configured to locate and inspect four side faces and a top face for the 3D package, for packages that are of varying spacings, positions, and/or orientations on the conveyance.

21. The method of claim 20, further comprising estimating a length, width, and height of the 3D package from the 3D imaging data.

22. A system for detecting package defects in packages transported on a conveyance, the system comprising:
- a plurality of three-dimensional (3D) imagers arranged about a conveyance to gather 3D imaging data for a 3D package having multiple nominally planar faces, while the package lies within a conveying volume, the 3D imagers gathering the 3D imaging data from at least two different viewpoints external to the conveying volume and looking into the conveying volume,
    - at least one of the different viewpoints to the left of the conveying volume,
    - at least one of the different viewpoints to the right of the conveying volume, and
    - at least one of the different viewpoints above the conveying volume; and
- a processing system comprising hardware logic and/or software logic stored on a non-transitory medium and configured to execute on processing circuitry, the processing system configured to perform operations comprising
    - locating edges of the package, using the leftmost data and the rightmost data of the 3D imaging data,
    - translating the 3D imaging data to at least one common reference frame,
        - wherein the at least one common reference frame comprises a first reference frame with an axis perpendicular to a top surface of the conveyance, and another axis parallel to the direction of motion of the conveyance,
    - classifying at least a portion of the 3D imaging data into corresponding data groups, each data group of the multiple data groups associated with a respective nominally planar face of the 3D package, and
    - for each face of the respective nominally planar faces of the 3D package associated with at least one data group with 3D imaging data classified to that group,
        - analyzing at least some 3D imaging data associated with that face to create one or more consistency measures as compared to an expected appearance of that face, and
        - flagging the package when at least one of the one or more consistency measures indicates a package defect.

23. A method for detecting package defects in packages transported on a conveyance, the method comprising:
- gathering three-dimensional (3D) imaging data for a 3D package having multiple nominally planar faces, while the package lies within a conveying volume, the 3D imaging data gathered from at least two different viewpoints external to the conveying volume and looking into the conveying volume,
    - at least one of the different viewpoints to the left of the conveying volume,
    - at least one of the different viewpoints to the right of the conveying volume, and
    - at least one of the different viewpoints above the conveying volume;
- classifying at least a portion of the 3D imaging data into corresponding data groups, each data group of the multiple data groups associated with a respective nominally planar face of the 3D package;
- for at least one face of the multiple nominally planar faces of the 3D package, determining that a given viewpoint of the different viewpoints has resulted in higher quality 3D imaging data of that face than the 3D imaging data gathered from others of the different viewpoints;
- selecting 3D imaging data gathered from the given viewpoint;
- analyzing at least some of the selected 3D imaging data associated with the at least one face of the multiple nominally planar faces of the 3D package to create one or more consistency measures as compared to an expected appearance of that face; and
- flagging the package when at least one of the one or more consistency measures indicates a package defect.

* * * * *